US007989554B2

(12) United States Patent
Zhao et al.

(10) Patent No.: US 7,989,554 B2
(45) Date of Patent: Aug. 2, 2011

(54) REACTING POLYALKYLENE OXIDE WITH BASE, TERTIARY ALKYL HALOACETATE, THEN ACID TO PREPARE POLYALKYLENE OXIDE CARBOXYLIC ACID

(75) Inventors: Hong Zhao, Edison, NJ (US); Anthony J. Martinez, Hamilton Square State, NJ (US)

(73) Assignee: Enzon Pharmaceuticals, Inc., Bridgewater, NJ (US)

( * ) Notice: Subject to any disclaimer, the term of this patent is extended or adjusted under 35 U.S.C. 154(b) by 1177 days.

(21) Appl. No.: 11/328,662

(22) Filed: Jan. 10, 2006

(65) Prior Publication Data

US 2007/0173615 A1 Jul. 26, 2007

(51) Int. Cl.
*A61K 47/12* (2006.01)
*C08G 65/332* (2006.01)
*C08L 71/02* (2006.01)
(52) U.S. Cl. ... 525/409; 424/94.4; 424/94.5; 424/179.1; 525/54.1
(58) Field of Classification Search .................. 525/408
See application file for complete search history.

(56) References Cited

U.S. PATENT DOCUMENTS

| | | |
|---|---|---|
| 4,179,337 A | 12/1979 | Davis et al. |
| 4,315,074 A | 2/1982 | Royer |
| 4,412,989 A | 11/1983 | Iwashita et al. |
| 4,645,741 A | 2/1987 | Inada |
| 4,670,417 A | 6/1987 | Iwasaki et al. |
| 4,760,176 A | 7/1988 | Halpern et al. |
| 4,814,098 A | 3/1989 | Inada et al. |
| 4,925,968 A | 5/1990 | Sestanj et al. |
| 5,006,333 A | 4/1991 | Saifer et al. |
| 5,122,514 A | 6/1992 | Boger et al. |
| 5,122,614 A | 6/1992 | Zalipsky |
| 5,145,992 A | 9/1992 | Mueller et al. |
| 5,183,660 A | 2/1993 | Ikeda et al. |
| 5,278,303 A | 1/1994 | Krepinsky et al. |
| 5,283,317 A | 2/1994 | Saifer et al. |
| 5,298,643 A | 3/1994 | Greenwald |
| 5,321,095 A | 6/1994 | Greenwald |
| 5,349,001 A | 9/1994 | Greenwald et al. |
| 5,389,381 A | 2/1995 | Phillips et al. |
| 5,389,647 A | 2/1995 | Baker et al. |
| 5,436,369 A | 7/1995 | Bronson et al. |
| 5,453,517 A | 9/1995 | Kuhn et al. |
| 5,489,594 A | 2/1996 | Bovy et al. |
| 5,527,791 A | 6/1996 | Betts et al. |
| 5,545,698 A | 8/1996 | Barany et al. |
| 5,605,976 A * | 2/1997 | Martinez et al. ............. 525/408 |
| 5,847,003 A | 12/1998 | Ptchelintsev et al. |
| 6,756,037 B2 | 6/2004 | Greenwald et al. |
| 2004/0053976 A1 | 3/2004 | Martinez et al. |
| 2005/0214250 A1 | 9/2005 | Harris et al. |

FOREIGN PATENT DOCUMENTS

| | | |
|---|---|---|
| EP | 0126942 | 5/1984 |
| EP | 0 824 126 B1 | 6/2003 |
| WO | 9324476 | 12/1993 |
| WO | 95/11924 | 5/1995 |
| WO | 96/23794 | 8/1996 |

OTHER PUBLICATIONS

McMurry, John. Organic Chemistry, $6^{th}$ ed. Brooks/Cole-Thomson Learning: Belmont, CA. 2004, p. 791.*
G. Marc Loudon, Organic Chemistry, Addison-Wesley Publishing Company, D3, pp. 1057-1058.
Richard B. Greenwald, et al., Poly(ethylene glycol) Conjugated Drugs and Prodrugs . . . , Critical Reviews in Therapeutic Drug Carrier Systems, vol. 17(2), pp. 101-161 (2000).
Yuichi Ohya, et al., Synthesis and Cytotoxic Activity of Conjugates of Monomethoxy . . . , Journal of Bioactive and Compatible Polymers, vol. 10, Jan. 1995.
Royer et al., Peptide synthesis in water and the use of immobilized carboxypeptidase Y for deprotection, Journal of the American Chemical Society 101:3394-3396, 1979.
Veronese et al. ("Preparation, Physico-Chemical and Pharmacokinetic Characterization of Monomethoxypoly (ethyleneglycol)-Derivatized Superoxide Dismutase," J. Controlled Release 10: 145-154 (1989)).
Greenwald et al., "Drug Delivery Systems: Water Soluble Taxol 2'-Poly(ethylene glycol) Ester Prodrugs—Design and in Vivo Effectiveness," J. Med. Chem 39 424-431 (Jan. 19, 1996).
Greenwald et al., "Drug Delivery Systems. 2. Camptothecin 20-O-Poly(ethylene glycol) Ester Transport Forms", J. Med. Chem. 39(10) 1938-1940 (May 10, 1996).
March, "Advanced Organic Chemistry", John Wiley & Sons, 1992 pp. 386-387.
Yamazaki et al., "Palladium-Catalyzed Asymmetric Amination using Novel Types of Chiral Biphosphine Ligands (BHMPs)," Tetrahedron: Asymmetry 6(1):51-54 (1995).
Reetz et al., "Stereoselevtive Syntheses of alpha-Hydroxy-gamma-amino Acids: Possible gamma-Turn Mimetics," J. Chem. Soc. Commun. 1605-1606 (1995).
Burke et al., "A Short Route to Avenaciolide & Isoavenaciolide via Radical Cyclization," Tetrahedron Letters 35(32) 5841-44 (1994).
Takahashi et al., "A New Method for the Introduction of Carbon-Carbon Triple Bond at C-13 in PG Synthesis. A Stereocontrolled Synthesis of ZK 96 480," J. Org. Chem. 53:1227-31 (1988).
Rubini et al., "Synthesis of Isoteric Methylene-Oxy Psuedodipeptide Analogues as Novel Amide Bond Surrogate Units," Tetrahedron 42(2) 6039-45 (1986).
Shibasaki et al., "Synthesis of Cis-Bicyclo[4.3.0]Non-2-ene Derivatives. The potent Homosocarbacyclin Analogs," Chem. Pharm. Bull. 37 (6)( 1647-49 (1989) (Communication to the Editor).

(Continued)

*Primary Examiner* — Robert Sellers
(74) *Attorney, Agent, or Firm* — Lucas & Mercanti, LLP

(57) ABSTRACT

A new method of preparing a tertiary alkyl ester of a polyalkylene oxide is provided. The new method employs milder conditions that avoid the back reaction to the starting polyalkylene oxide. The tertiary alkyl ester of a polyalkylene oxide is then reacted with a suitable acid to produce a polyalkylene oxide acid.

27 Claims, 2 Drawing Sheets

OTHER PUBLICATIONS

Lee et al., "Syntheses and Reactions of 2-Halo-5-thiazolecarboxylates," J. Heterocyclic Chem. 22: 1621-1630 (1985).
Ayra et al., "Rapid Syntesis and Introduction of a Protected EDTA-like Group during the Solid-Phase Assembly of Particles," Bioconjugate Chem. 2: 323-336 (1991).
Abraham et al., "Design, Synthesis, and Testing of Potential Antisickling Agents. 5. Disubstituted Benzoic Acids Designed for the Donor Site and Proline Salicylates Designed for the Acceptor Site," J. Med. Chem 27: 11549-1559 (1984).
Streitweiser & Heathcock, "Introduction to Organic Chemistry", Macmillan, New York & London, 1976.
Eur. Polym. J. vol. 19 No. 12 pp. 1177-1183 (1983).
Biotechnology and Applied Biochemistry 9. 258-268 (1987).
Advanced Drug Delivery Reviews 6 (1991) 133-151.
Cancer Biochem. Biophys. (1984) vol. 7 pp. 175-186.
Polymer Bulletin 18, 487-493 (1987).
Journal of Polymer Science: Polymer Chemistry Edition, vol. 22 pp. 341-352 (1984).
Int. Arch Allergy Appl. Immun. 64: 84-99 (1981).
Dal Pozzo et al., Chem. Abstracts 112:56926 (1989).

* cited by examiner

REACTING POLYALKYLENE OXIDE WITH BASE, TERTIARY ALKYL HALOACETATE, THEN ACID TO PREPARE POLYALKYLENE OXIDE CARBOXYLIC ACID

FIELD OF THE INVENTION

The present invention relates to improved and more efficient methods of preparing activated polyalkylene oxide acids and esters of enhanced purity.

BACKGROUND OF THE INVENTION

The conjugation of water-soluble polyalkylene oxide ("PAO") with therapeutic moieties such as proteins and polypeptides is known. See, for example, U.S. Pat. No. 4,179,337, the disclosure of which is hereby incorporated by reference. The '337 patent discloses that physiologically active polypeptides modified with PEG circulate for extended periods in vivo, have reduced immunogenicity and antigenicity.

To conjugate PAO with other compounds, the hydroxyl end-groups of the polymer must first be converted into reactive functional groups. This process is frequently referred to as "activation" and the product is called an activated polyalkylene oxide or activated PAO.

For the most part, research has been directed to covalent attachment of PAO's to epsilon amino groups of proteins, enzymes and polypeptides. Covalent attachment of PAO's to lysine amino groups has been effected by linking groups such as succinoyl-N-hydroxysuccinimide ester, as disclosed by Abuchowski et al., Cancer Biochem. Biophys., 7, 175-86 (1984), azlactones, aryl imidates and cyclic imide thiones. See U.S. Pat. Nos. 5,298,643, 5,321,095, and 5,349,001, for example. The contents of each of the foregoing patents are hereby incorporated by reference herein. PAO's have also been activated with hydrazine groups in order to couple the polymer to activated carbohydrate groups.

In addition, the conversion of terminal hydroxy groups of PAO's, such as polyethylene glycol ("PEG"), to carboxylic acids has also been reported. PEG-acids are useful in at least two regards. First, carboxylic acid derivatives can be used directly to conjugate nucleophiles via available hydroxyl or amino moieties. Secondly, PEG carboxylic acids can be used as intermediates to form other types of activated polymers. For example, mPEG carboxylic acids can be converted to the succinimidyl ester derivative via N-hydroxysuccinimide and a condensing agent such as diisopropyl carbodiimide. Other activated PAO's can be prepared by reaction of the active ester with hydrazine to produce PAO-hydrazide derivatives.

Co-owned U.S. Pat. No. 5,605,976 (the '976 patent), incorporated by reference herein, solved many previous difficulties in preparing polyalkylene oxide carboxylic acids. The '976 patent taught a process for preparing PAO carboxylic acids by reacting a PAO (i.e., PAO-OH) with a tertiary alkyl haloacetate in the presence of a base to form a tertiary alkyl ester of PAO, and then reacting the PAO tertiary alkyl ester with an acid, to form the desired polyalkylene oxide carboxylic acid.

In the time since the methods of the '976 patent were developed, a need for further improvements arose. For example, with improvements in NMR instrumentation, it became apparent that batches of PEG-acid still contained ~5% PEG-OH impurity. In addition, it was determined that levels of contamination with the native PEG-OH tended to increase with the molecular weight of the polymer, and with the use of disubstituted and branched PEG polymers. In addition, the processes taught by the '976 patent required at least 18 hours of reaction time, as well as refluxing and rotary evaporation of the reaction solvent.

For at least the foregoing reasons, there remains a longstanding need in the art for more rapid, and therefore more economical, methods for preparing PAO carboxylic acids, as well a need for methods for producing PAO acids and intermediates of much higher purity that are free of any detectable PAO-OH contamination. The present invention addresses these needs.

SUMMARY OF THE INVENTION

In one aspect, the present invention includes methods of preparing polyalkylene oxide carboxylic acids and intermediates related thereto in high purity. The methods include first preparing a tertiary alkyl ester of a polyalkylene oxide followed by conversion to the carboxylic acid derivative thereof. The tertiary alkyl ester of the polyalkylene oxide is prepared by the steps of:

(a) reacting a polyalkylene oxide with a base, in a first solvent system, for a time period ranging from about 10 minutes to about 60 minutes; and (b) reacting the product of step (a) in a second solvent system, with a tertiary alkyl haloacetate for a time period of less than about 30 minutes. The reaction of steps (a) and (b) are conducted at temperatures of from about 10° C. to about 35° C.

The resultant tertiary alkyl ester of the polyalkylene oxide is then converted to the corresponding carboxylic acid by reacting the tertiary alkyl ester of the polyalkylene oxide with an acid to form a polyalkylene oxide carboxylic acid. This method advantageously provides material in high yield and purity.

Within this aspect of the invention, the preferred polyalkylene oxides include polyethylene glycol and omega-methoxy-polyethylene glycol. Preferred tertiary alkyl haloacetates include t-butyl bromo- or chloro-acetate as well as other tertiary alcohol esters of the haloacetic acid. The preferred bases used in the method include, for example, potassium t-butoxide, butyl lithium, and the like. The methods can be carried out using metal t-butoxides in an alcohol such as t-butanol or in other inert solvents such as toluene.

The methods of the present invention can be carried out using approximately equimolar ratios of tertiary alkyl haloacetate to polyalkylene oxide. It is preferred, however, that the tertiary alkyl haloacetate be present in an amount which is greater than the polyalkylene oxide on a molar basis.

In further aspects of the invention, there are provided methods of preparing high purity alpha and/or omega substituted polyalkylene oxides such as PEG-hydrazines, PEG-amides and PEG-esters including the succinimidyl, methyl and ethyl esters. These aspects include converting the polyalkylene oxide carboxylic acids described above into the desired terminally substituted polymer.

In yet a still further aspect of the invention, methods of preparing polyalkylene oxide-biologically active nucleophile conjugates are disclosed. In this aspect of the invention, the polyalkylene oxide carboxylic acids are reacted with a biologically-active nucleophile so that an ester linkage is formed between the polymer and the biologically-active nucleophile. For example, in this aspect of the invention, taxol-2' PEG-monoesters and 20-campthothecin PEG-esters or diesters using bis-activated PEG's can be prepared.

One of the chief advantages of the present invention is that the resulting polyalkylene oxide carboxylic acids are prepared in high purity, even in comparison to those made with more recently discovered techniques. Thus, product contaminants, namely, the starting materials, such as m-PEG-OH are not found in appreciable amounts, that is, they are found in amounts of preferably less than about 2% and preferably less than 1% and most preferably less than 0.5%. As a result, the separation of the desired carboxylic acid derivative from the starting alcohol is not required. Furthermore, tedious ion exchange or reverse phase HPLC techniques are not required to provide the desired carboxylic acid derivative.

DETAILED DESCRIPTION OF THE INVENTION

Figure 1:
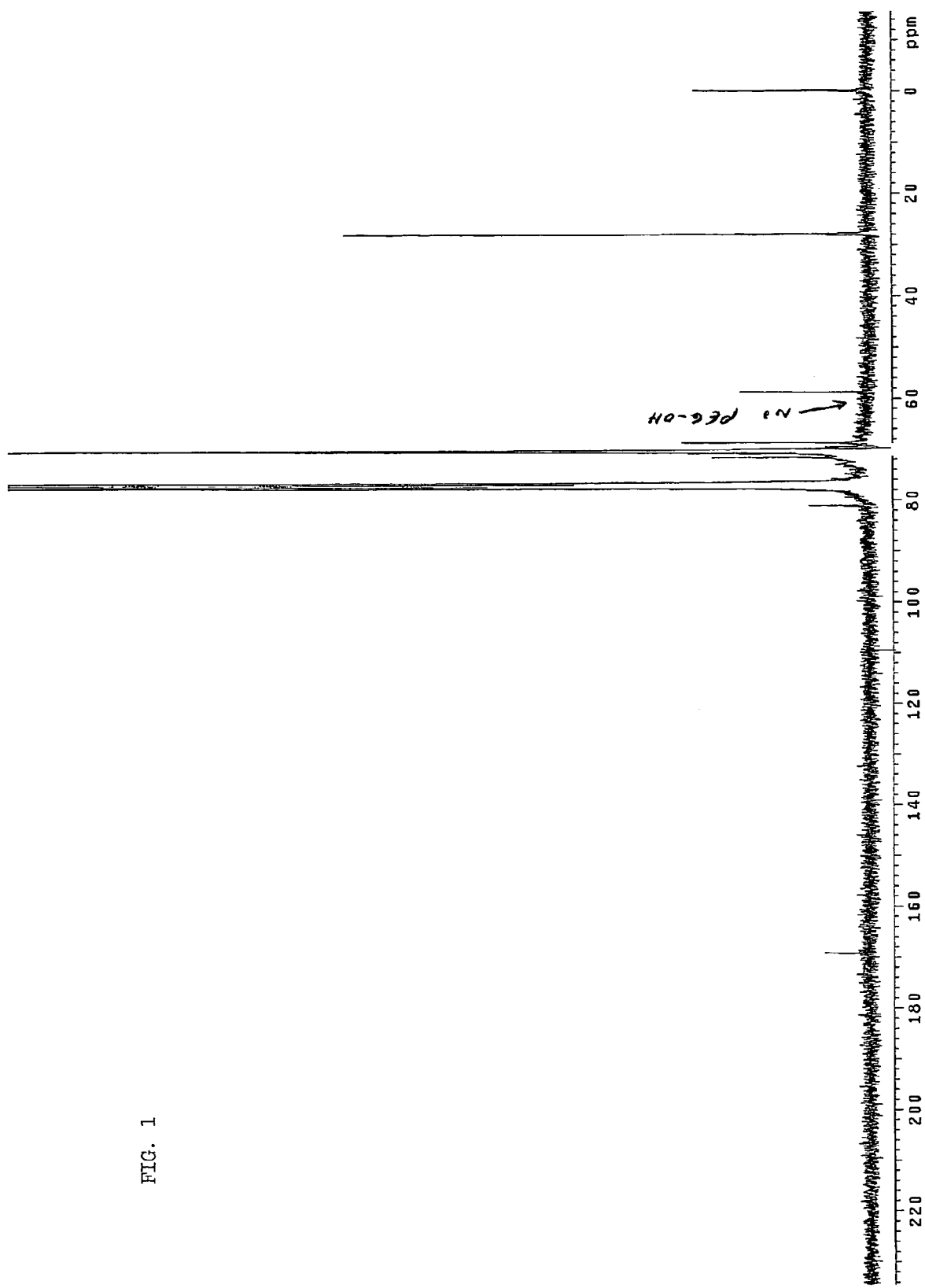
FIG. 1 is an NMR spectra corresponding to Example 1.

The present invention provides improved processes for preparing polyalkylene oxide carboxylic acids and synthetic intermediates, such as tertiary alkyl esters of polyalkylene oxides. Broadly, PAO carboxylic acids are prepared by reacting a PAO (i.e., a PAO-OH) with a suitable tertiary-alkyl haloacetate, in the presence of a suitable base, to form a PAO tertiary alkyl ester, and then reacting that PAO tertiary alkyl ester with an acid, to obtain a PAO carboxylic acid. Previous methods employed reaction under reflux, followed by rotary drying to separate the product from the solvent system. Both of these process steps have now been discovered to allow the PAO tertiary alkyl ester to partially revert to the starting material, i.e., back to PAO-alcohol. This back reaction leads to undesirable impurities, such as high molecular weight PEG impurities and PEG-drug conjugates with different linkages, and results in a slower and less efficient reaction process.

Thus, in contrast to previous methods of preparing PAO esters and acids, it has now unexpectedly been discovered that improvements are realized when the reactions are conducted in the presence of base at the lowest practical temperature range, and with the lowest effective concentrations of base. The lower limit of the reaction temperature is set by the precipitation point of the reactants and product in the selected solvent system. Further details about the present invention are provided below.

derivatives include those containing mono-terminal $C_1$-$C_4$ groups. In one embodiment, straight-chained non-antigenic polymers, such as monomethyl PEG homopolymers are preferred. In other embodiments, branched polymers or "U-PEGs" are preferably employed, depending on the nature of the agent or medicament to be conjugated to the polymer. Alternative polyalkylene oxides such as other poly(ethylene glycol) homopolymers, other alkyl-poly(ethylene oxide) block copolymers, and copolymers of block copolymers of poly(alkylene oxides) are also useful. The polymers of the present invention have a molecular weight of between about 200 and about 100,000 daltons and preferably between about 2,000 and about 80,000 daltons. Molecular weights of between about 4,000 and about 50,000 daltons, however, are most preferred.

For purposes of illustration and not limitation, the polyethylene glycol (PEG) residue can be one of Me-O—$(CH_2CH_2O)_x$—$CH_2CH_2$—O—

Me-O—$(CH_2CH_2O)_x$—$CH_2CH_2$—S—

—O—$CH_2CH_2$—O—$(CH_2CH_2O)_x$—$CH_2CH_2$—O—, and

—S—$CH_2CH_2$—O—$(CH_2CH_2O)_x$—$CH_2CH_2$—S—.

The degree of polymerization for the polymer represents the number of repeating units in the polymer chain and is dependent on the molecular weight of the polymer. Although substantially non-antigenic polymers, PAO's and PEG's can vary substantially in weight average molecular weight, preferably, $R_1$ has a weight average molecular weight of from about 200 to about 100,000 Daltons in most aspects of the invention. More preferably, the substantially non-antigenic polymer has a weight average molecular weight from about 2,000 to about 48,000 Daltons.

The PEG can also be a "star-PEG" or multi-armed PEG's such as those described in NOF Corp. Drug Delivery System catalog, 2005, the disclosure of which is incorporated herein by reference. Specifically, the PEG can be of the formula:

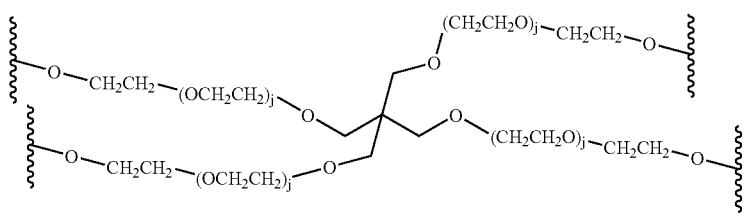

1. Polymer Substituents and Polyalkylene Oxides

The carboxylic acid derivatives of the present invention are preferably prepared from poly(alkylene oxides) (PAO's) such as polyethylene glycol which are water soluble at room temperature. Within this group are omega-substituted polyalkylene oxide derivatives such as methoxypoly (ethylene glycols) (mPEG-OH). Other suitable alkyl-substituted PAO wherein:

j is an integer from about 10 to about 340, to preferably provide polymers having a total molecular weight of from about 12,000 to about 40,000; and at least 1, but up to 3, of the terminal portions of the residue is/are capped with a methyl or other lower alkyl. Such compounds prior to conversion to the $CO_2H$ derivative include:

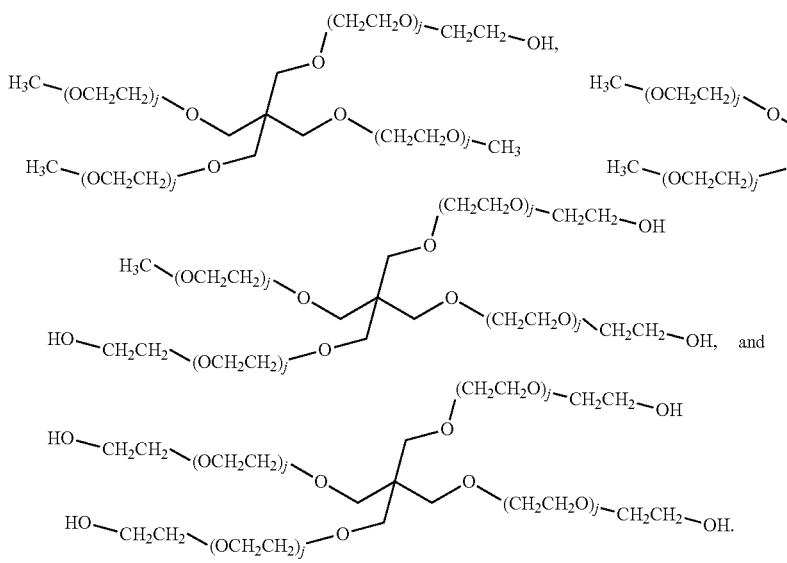

Also contemplated within the scope of the invention, is the formation of other PEG-based compounds having a terminal $CO_2H$ thereon, including those branched polymer residues described in commonly assigned U.S. Pat. Nos. 5,605,976, 5,643,575, 5,919,455 and 6,113,906, the disclosure of each being incorporated herein by reference. A representative list of some specific polymers corresponding to Formula I includes:

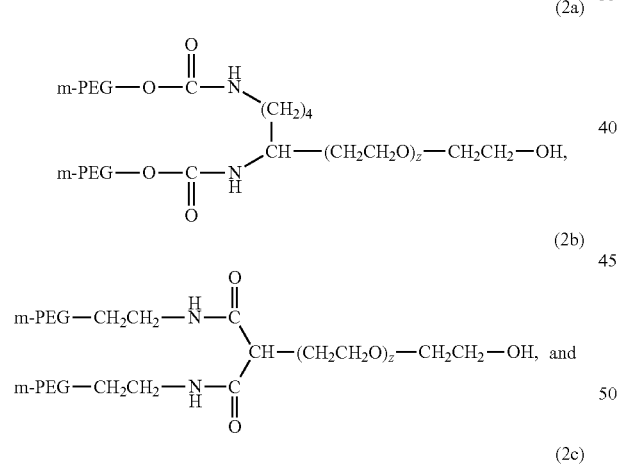

(2c)

HO—$(CH_2CH_2O)_x$—$L_1$—$L_2$—$L_3$—$(CH_2CH_2O)_z$—$CH_2CH_2$—OH wherein $L_1$, $L_2$ and $L_3$ are independently selected bifunctional linkers and $L_2$ can alternatively be a branched linking group such as a diamino alkyl or lysine residue. See, for example, the aforementioned U.S. Pat. No. 6,113,906, for example; and z is an integer from 1 to about 120.

Bifunctional linking groups are known to those of ordinary skill. Thus, the $L_{1-3}$ moieties can be independently selected from among bifunctional linking groups such as one of the following non-limiting compounds:

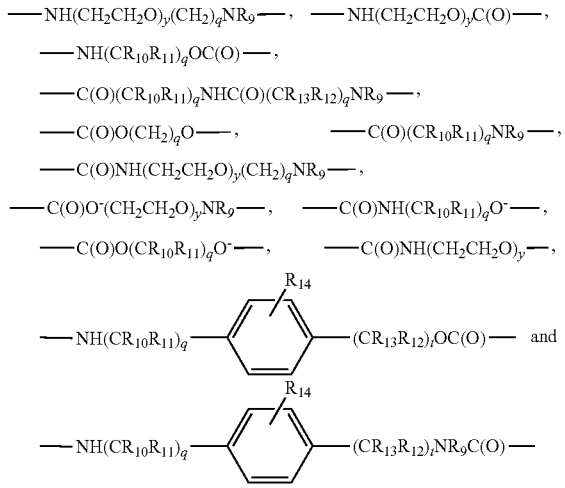

wherein $R_{9-13}$ are independently selected from the same group as $C_{1-6}$ alkyls, etc. and preferably H or $CH_3$;

$R_{14}$ is selected from the same group as that which defines $R_{9-13}$ as well as $NO_2$, $C_{1-6}$ halo-alkyl and halogen;

q, t and y are each independently selected positive integers such as from 1 to about 12.

The method of the present invention can also be carried out with alternative polymeric substances such as dextrans or other similar non-immunogenic polymers that are capable of being functionalized or activated as mono- or bis-carboxylic acids such as dextran, polyvinyl alcohols, carbohydrate-based polymers, hydroxypropyl-methacrylamide (HPMA), polyalkylene oxides, and/or copolymers thereof. See also commonly-assigned U.S. Pat. No. 6,153,655, the contents of which are incorporated herein by reference. The foregoing list is merely illustrative and not intended to restrict the type of non-antigenic polymers suitable for use herein.

2. Synthesis of the Tertiary Alkyl Ester Derivatives

The methods of the present invention for preparing a polyalkylene oxide carboxylic acid include first preparing tert alkyl ester derivatives of PAO, by a process of:

(a) reacting a polyalkylene oxide with a base, in a first solvent system, for a time period ranging from about 10 minutes to about 60 minutes, or more preferably for a time period ranging from about 20 minutes to about 40 minutes, (b) reacting the product of step (a) with a tertiary alkyl haloacetate for a time period of less than 30 minutes, e.g., from about 1 minute to about 30 minutes, or more preferably for a time period ranging from about 1 minutes to about 15 minutes, in a second solvent system to provide a PAO tertiary alkyl ester.

The solvent system preferably remains the same from step (a) to step (b), as does the temperature, which preferably ranges from about 10° C. to about 35° C., or more preferably from about 20 to about 31° C. Thus, the first and second solvent systems are usually the same. In order for the back-reaction of PAO tertiary alkyl ester to be minimized, a sufficient dilution of the PAO in the solvent system is necessary. It is preferred that the ratio of PAO to solvent system is about 1 g PAO to about 10-25 ml, or more, of solvent system. More preferably, the ratio of PAO to solvent system is about 1 g of PAO to about 15 ml of solvent system.

The PAO tertiary alkyl ester reaction product is precipitated from the solvent system by any suitable art-known method, such as by adding a miscible solvent to the solvent system for which the reaction product is relatively insoluble, and/or by lowering the temperature of the solvent system. The precipitate is collected, subject to washing for one or more times with a suitable non-solubilizing solvent, and further purified, e.g., by recrystalization.

The solvent system can be any suitable art-known solvent or mixture of solvents selected to carry the reactants and reaction products in solution. In certain preferred embodiments, the solvent system is selected to avoid precipitation of the reactants and reaction products at low temperatures. As exemplified hereinbelow, the solvent system comprises toluene, e.g., 100% toluene, and the precipitant is ethyl ether. In alternative embodiments, the solvent system optionally comprises toluene ranging in concentration from 99% to 5%, in admixture with one or more additional compatible solvent, such as methylene chloride and/or ethylene chloride.

The base is selected from the group consisting of potassium t-butoxide, sodium t-butoxide, butyl lithium, sodium amide, sodium hydride, and combinations thereof. Suitable tertiary-alkyl haloacetates are of the formula:

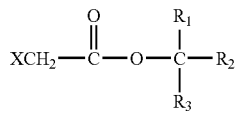

wherein X is chlorine, bromine or iodine;

$R_{1-3}$ are independently selected from $C_{1-8}$ alkyls, substituted alkyls or branched alkyls, aryls such as phenyl or substituted phenyls.

Preferred t-butyl haloacetates include t-butyl bromoacetate, t-butyl chloroacetate, and t-butyl iodoacetate. Such t-butyl haloacetates are available, for example, from Sigma Chemical Co., St. Louis, Mo. Alternatively, trityl or substituted aryl esters can be used.

3. Synthesis of the Carboxylic Acid Derivatives

In order to produce a PAO carboxylic acid, the resulting PAO tertiary alkyl ester is then reacted in a suitable solvent system, in the presence of a suitable acid, to form a PAO carboxylic acid. The solvent system for the acidification reaction is exemplified hereinbelow as methylene chloride, although other suitable art-known solvents are optionally employed such as chloroform, or dichloroethane. The acid is any art-known acid effective to produce the desired PAO carboxylic acid, including, for example, trifluoroacetic acid, sulfuric, phosphoric and hydrochloric acids. Trifluoroacetic acid is exemplified and preferred in some aspects of the invention.

The first step of the preparation of the PAO carboxylic acids of the present invention includes forming an intermediate, t-butyl ester of polyalkylene oxide carboxylic acid. This intermediate is formed by reacting a PAO with a t-butyl haloacetate as described above in the presence of a base. The preferred base is potassium t-butoxide, although alternatives such as butyl lithium, sodium amide, or sodium hydride can also be used. These bases can be used in the methods described herein as a solid, or more preferably, dissolved in a suitable solvent such as t-butanol, benzene, toluene, tetrahydrofuran (THF), dimethylformamide (DMF), dimethylsulfoxide (DMSO), hexane and the like.

In order to form the intermediate, the polyalkylene oxide is reacted with the t-butyl haloacetate in an amount which is approximately a molar ratio ranging from about 1:1 to about 1:10. Preferably, however, the t-butyl haloacetate is present in a molar ratio of about 1:8. Further, the molar ratio of the polyalkylene oxide to the base ranges from about 1:1 to about 1:2.

Once the t-butyl ester intermediate has been formed, the carboxylic acid derivative of the polyalkylene oxide can be readily provided in purities exceeding 92%, preferably exceeding 97%, more preferably exceeding 99% and most preferably exceeding 99.5% purity. Thus, contaminants, particularly with regard to the starting material, e.g., mPEG-OH or PEG diol are found in only trace amounts. In preferred aspects of the invention, where mono or bis-polyethylene glycol carboxylic acids are prepared, the amount of starting material contaminant found in the final product is less than 1%, as determined by $^{13}$C NMR.

In this aspect of the invention, the t-butyl ester intermediate is reacted with at least an equivalent amount of an acid such as trifluoroacetic acid in order to provide the terminally substituted carboxylic acid of the PAO. Alternatively, dilute hydrochloric acid, i.e. about 1 N, sulfuric, phosphoric acid, etc. can be used. The excess amount allows the artisan to convert the t-butyl ester intermediate to the desired carboxylic acid derivative and counteract the buffering capacity of PEG or related starting polymer material. The temperature for the reaction with acid is not as critical as for the reaction with the base, and is generally carried out at ambient temperatures, e.g., at a temperature ranging from about 18 to about 30° C.

The desired mono- or bis-carboxylic acid derivative is obtained after allowing a sufficient time to assure conversion of the intermediate to the final acid derivative, which can be about 2-3 hours. The reaction time, however, will vary somewhat depending upon the particular reactants and reaction conditions. After conversion of the intermediate to the final desired carboxylic acid, the solvent, i.e., methylene chloride, for example, is removed by distillation using techniques known to those of ordinary skill in the art such as rotary evaporation or the like. The resultant residue is recrystallized from methylene chloride/ethyl ether, 2-propanol, dimethylformamide/2-propanol, toluene/ethyl ether or toluene/hexane to yield the final product.

After completion of the novel method, additional purification by conventional methods is not required since the methods described herein provide the desired carboxylic acid in very high purity, i.e., preferably greater than 99%, thus providing the artisan with significant savings in terms of time, labor and materials when pharmaceutical grade polymer is desired.

4. Additional Alpha and/or Omega Terminal Moieties

As a further aspect of the invention, the mono- or bis—carboxylic acid derivatives can be used to form other activated polyalkylene oxides. For example, the terminal carboxylic acid group(s) can be converted to:

I. Functional groups capable of reacting with an amino group such as:
 a) succinimidyl ester;
 b) carbonyl imidazole;
 c) azlactones;
 d) cyclic imide thiones;
 e) isocyanates or isothiocyanates; or
 f) aldehydes II. Functional groups capable of reacting with carboxylic acid groups and reactive carbonyl groups such as hydrazine or hydrazide functional groups such as the acyl hydrazides, carbazates, semicarbazates, thiocarbazates, etc.

The conversion of PEG-$CO_2$H into various other leaving groups can be carried out using techniques known to those of ordinary skill without undue experimentation. Conversion reactions have also been reported in the relevant literature.

The terminal activating group can also include a spacer moiety located proximal to the polyalkylene oxide. The spacer moiety may be a heteroalkyl, alkoxy, alkyl containing up to 18 carbon atoms or even an additional polymer chain. The spacer moieties can be added using standard synthesis techniques.

5. Conversion of the Carboxylic Acid Derivatives

The polymer carboxylic acid derivatives also serve as high purity intermediates which can used to form additional polyalkylene oxide derivatives. For example, high purity amides, hydrazides, other esters and the like can be formed from the PAO carboxylic acid activated N-hydroxysuccinimide ester by condensing with the appropriate reagent (amides, hydrazines, etc.) using standard techniques.

Alternatively, the carboxylic acid derivative can be converted into a succinimidyl ester by reacting the carboxylic acid with dicyclohexyl carbodiimide (DCC) or diisopropyl carbodiimide in the presence of base.

These subsequent conversion reactions are essentially standard techniques well known to those of ordinary skill in the art. An important aspect of this feature of the invention is the fact that the intermediate, e.g. PEG-carboxylic acid is essentially pure (99+ %) and thus assures the artisan of an essentially pure final product.

6. Biologically Active Materials Suitable for Conjugation

The nucleophiles conjugated with the carboxylic acid derivatives are described as "biologically active". The term, however, is not limited to physiological or pharmacological activities. For example, some nucleophile conjugates such as those containing enzymes, are able to catalyze reactions in organic solvents. Likewise, some inventive polymer conjugates are also useful as laboratory diagnostics. A key feature of all of the conjugates is that at least some portion of the activity associated with the unmodified biologically active material is maintained.

In accordance with one aspect of the invention, the $CO_2$H—PEG derivative is reacted with a nucleophile, having an available hydroxyl moiety capable of undergoing a substitution reaction without loss of bioactivity, is reacted with the carboxylic acid derivative of the polymer, such as the highly pure PEG-COOH, under conditions sufficient to cause the formation of an ester linkage between the two substituents.

While not wishing to be bound by any particulars relating to specific conjugation reactions, the prodrugs of the invention are generally prepared by:

1) providing an activated polymer, such as a PEG-acid or PEG-diacid as prepared herein and a biologically active compound having a position thereon which will allow a hydrolyzable linkage to form, and 2) reacting the two substituents in an inert solvent such as methylene chloride, chloroform, toluene or DMF in the presence of a coupling reagent such as 1,3-diisopropyl-carbodiimide (DIPC), 1,(3-dimethyl aminopropyl) 3-ethyl carbodiimide (EDC), any suitable dialkyl carbodiimide, Mukaiyama reagents, (e.g. 2-halo-1-alkyl-pyridinium halides) or propane phosphonic acid cyclic anhydride (PPACA), etc. which are available, for example from commercial sources such as Sigma Chemical, or synthesized using known techniques and a base such as dimethylaminopyridine (preferred), diisopropyl ethylamine, pyridine, triethylamine, etc. at a temperature from 0° C. up to 22° C. (room temperature).

An illustrative list of compounds which can be conjugated with the polymers prepared herein are shown below:

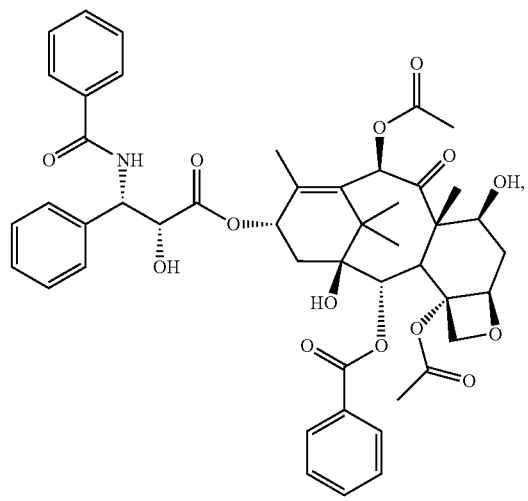

paclitaxel podophyllotoxin camptothecin

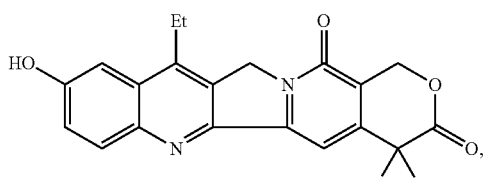

7-ethyl-10-hyroxycamptothecin-SN38

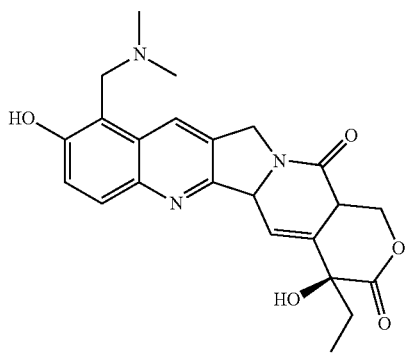

topotecan and any number of small molecules known to those of ordinary skill having an —OH group for conjugation with the activated polymers described herein. Properly protected compounds will be required where more than one OH is available for conjugation using art recognized protection or deprotection techniques.

In a further aspect of the invention, when the carboxylic acid has been converted to an alternative terminal functional group, such as a succinimidyl ester, conjugation of the activated polymer with the desired nucleophile is achieved by reacting the polymer with a biologically-active nucleophile containing an available amino group. See also, for example, U.S. Pat. No. 5,122,614, the disclosure of which is incorporated herein by reference. Similarly, when other linking groups such as those set forth above in Section 3, are used, PAO-conjugates can be prepared by reacting the desired activated polymer with a biologically-active material containing a desired target linking group, i.e., $NH_2$, COOH, etc. It is to be understood that the conditions used for completing these conjugation reactions are selected so as to maintain optimum biological activity of the conjugate.

The conjugates are biologically active and have numerous therapeutic applications. Mammals in need of treatment which includes a biologically active material can be treated by administering an effective amount of a polymer conjugate containing the desired bioactive material. For example, mammals in need of enzyme replacement therapy or blood factors can be given polymer conjugates containing the desired material. The doses of such conjugates are amounts which are sufficient to achieve a desired therapeutic result and will be apparent to those of ordinary skill based on clinical experience.

Biologically active nucleophiles of interest of the present invention include, but are not limited to, proteins, peptides, polypeptides, enzymes, organic molecules of natural and synthetic origin such as medicinal chemicals and the like.

Enzymes of interest include carbohydrate-specific enzymes, proteolytic enzymes, oxidoreductases, transferases, hydrolases, lyases, isomerases and ligases. Without being limited to particular enzymes, examples of enzymes of interest include asparaginase, arginase, arginine deaminase, adenosine deaminase, superoxide dismutase, endotoxinases, catalases, chymotrypsin, lipases, uricases, adenosine diphosphatase, tyrosinases and bilirubin oxidase. Carbohydrate-specific enzymes of interest include glucose oxidases, glucosidases, galactosidases, glucocerebrosidases, glucouronidases, etc.

Proteins, polypeptides and peptides of interest include, but are not limited to, hemoglobin, serum proteins such as blood factors including Factors VII, VIII, and IX; immunoglobulins, cytokines such as interleukins, α-, β- and γ-interferons, colony stimulating factors including granulocyte colony stimulating factors, platelet derived growth factors and phospholipase-activating protein (PLAP). Other proteins of general biological or therapeutic interest include insulin, plant proteins such as lectins and ricins, tumor necrosis factors, growth factors, tissue growth factors, TGFα's or TGFβ's and epidermal growth factors, hormones, somatomedins, erythropoietin, pigmentary hormones, hypothalamic releasing factors, antidiuretic hormones, prolactin, chorionic gonadotropin, follicle-stimulating hormone, thyroid-stimulating hormone, tissue plasminogen activator, and the like. Immunoglobulins of interest include IgG, IgE, IgM, IgA, IgD and fragments thereof.

Some proteins such as the interleukins, interferons and colony stimulating factors also exist in non-glycosylated form, usually as a result of using recombinant techniques. The non-glycosylated versions are also among the biologically active nucleophiles of the present invention.

The biologically active nucleophiles of the present invention also include any portion of a polypeptide demonstrating in-vivo bioactivity. This includes amino acid sequences, antisense moieties and the like, antibody fragments, single chain antigen binding proteins, see, for example U.S. Pat. No. 4,946,778, disclosure of which is incorporated herein by reference, binding molecules including fusions of antibodies or fragments, polyclonal antibodies, monoclonal antibodies, catalytic antibodies, nucleotides and oligonucleotides.

The proteins or portions thereof can be prepared or isolated by using techniques known to those of ordinary skill in the art such as tissue culture, extraction from animal sources, or by recombinant DNA methodologies. Transgenic sources of the proteins, polypeptides, amino acid sequences and the like are also contemplated. Such materials are obtained from transgenic animals, i.e., mice, pigs, cows, etc., wherein the proteins are expressed in milk, blood or tissues. Transgenic insects and baculovirus expression systems are also contemplated as sources. Moreover, mutant versions of proteins, such as mutant TNF's and mutant interferons are also within the scope of the invention.

Other proteins of interest are allergen proteins such as ragweed, Antigen E, honeybee venom, mite allergen, and the like.

Useful biologically active nucleophiles are not limited to proteins and peptides. Essentially any biologically-active compound is included within the scope of the present invention. Chemotherapeutic molecules such as pharmaceutical chemicals i.e. anti-tumor agents, cardiovascular agents, antineoplastics, anti-infectives, anti-anxiety agents, gastrointestinal agents, central nervous system-activating agents, analgesics, fertility or contraceptive agents, anti-inflammatory agents, steroidal agents, anti-urecemic agents, cardiovascular agents, vasodilating agents, vasoconstricting agents and the like are included. In preferred aspects of the invention, the carboxylic acid derivative is reacted under conditions which afford an ester linkage between the polymer and chemotherapeutic moiety. Particularly preferred biologically active nucleophiles include taxol, taxanes, taxotere, camptothecin, podophyllotoxin, hemoglobin, glucocerebrosidase, galactosidase, arginase, asparaginase, arginine deaminase and superoxide dismutase.

The foregoing is illustrative of the biologically active nucleophiles which are suitable for conjugation with the polymers of the invention. It is to be understood that those biologically active materials not specifically mentioned but having suitable nucleophilic groups are also intended and are within the scope of the present invention.

EXAMPLES

The following non-limiting examples illustrate certain aspects of the invention. All parts and percentages are by weight unless otherwise noted and all temperatures are in degrees Celsius.

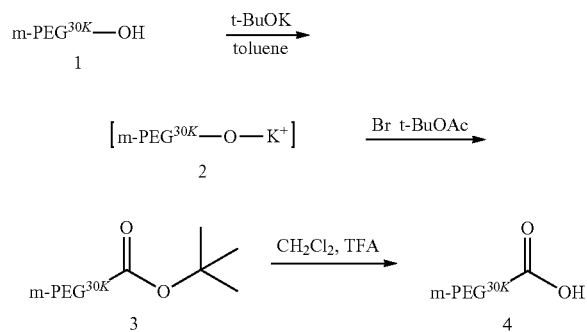

Example 1 m-PEG$^{30K}$ Ester 3

With reference to FIG. 1, a solution of 31 g (1.03 mmoles) of m-PEG$^{30K}$-OH (compound 1), in 600 ml of toluene was azeotroped with the removal of 130 ml of distillate. The reaction mixture was then cooled to 30° C., followed by the addition of 2.1 ml (2.07 mmoles) of a 1.0 molar solution potassium t-butoxide in t-butanol. The resulting mixture was stirred for 10-60 minutes at 30° C. (producing compound 2), followed by the addition of 1.6 g (8.3 mmoles) of t-butyl bromoacetate. The resulting cloudy mixture was stirred for 1 hr at 30° C. The product (compound 3) was precipitated from the reaction mixture with ether, collected by filtration and washed with additional ether. This crude product was recrystallized from 12% DMF/IPA to yield 27.8 g (90% yield). The product was confirmed by $^{13}$C NMR to be >99% pure because no peak was found at 60.5 ppm for PEG-OH. See FIG. 1. $^{13}$C NMR (75.4 MHz, CDCl$_3$)δ 169.07, 81.01, 71.54-68.62 (PEG), 58.65, 27.82.

Example 2 m-PEG$^{30K}$ Acid 4

A solution of 8.7 g (0.13 mmoles) of m-PEG$^{30}$K ester (compound 3), in 90 ml of methylene chloride and 45 ml of TFA was stirred for 3 hrs at room temperature, followed by partial removal of the solvent by rotovap, and precipitation of the product with ether. The solid was collected by filtration, and washed several times with ether, recrystallized from 12% DMF/IPA and dried to yield 8.2 g (94% yield) of product (compound 4). The product was confirmed by $^{13}$C NMR to be >99% pure.

$^{13}$C NMR (75.4 MHz, CDCl$_3$) δ 170.90, 71.54-68.18 (PEG), 58.65.

Example 3

TAXOL-2' mPEG 30,000 MONOESTER PREPARATION

The mPEG 30,000 acid (3750 mg, 0.125 mmol, compound 4) from Example 2 was azeotroped and then dissolved in 20 ml of anhydrous methylene chloride at room temperature. The above solution was treated with 1,3-diisopropyl-carbodiimide (26 µl, 0.17 mmol), 4-dimethylaminopyridine (32 mg, 0.26 mmol) and taxol (146 mg, 0.17 mmol) at 0° C. The reaction solution was warmed to room temperature after 30 minutes and kept at that temperature for 16 hours. The reaction mixture was then washed with 0.1 n HCl, dried and evaporated to yield a white solid which was crystallized from 2-propanol to yield 3000 mg (80% yield) of pure product 5.

Example 4 Comparative

Figure 2:
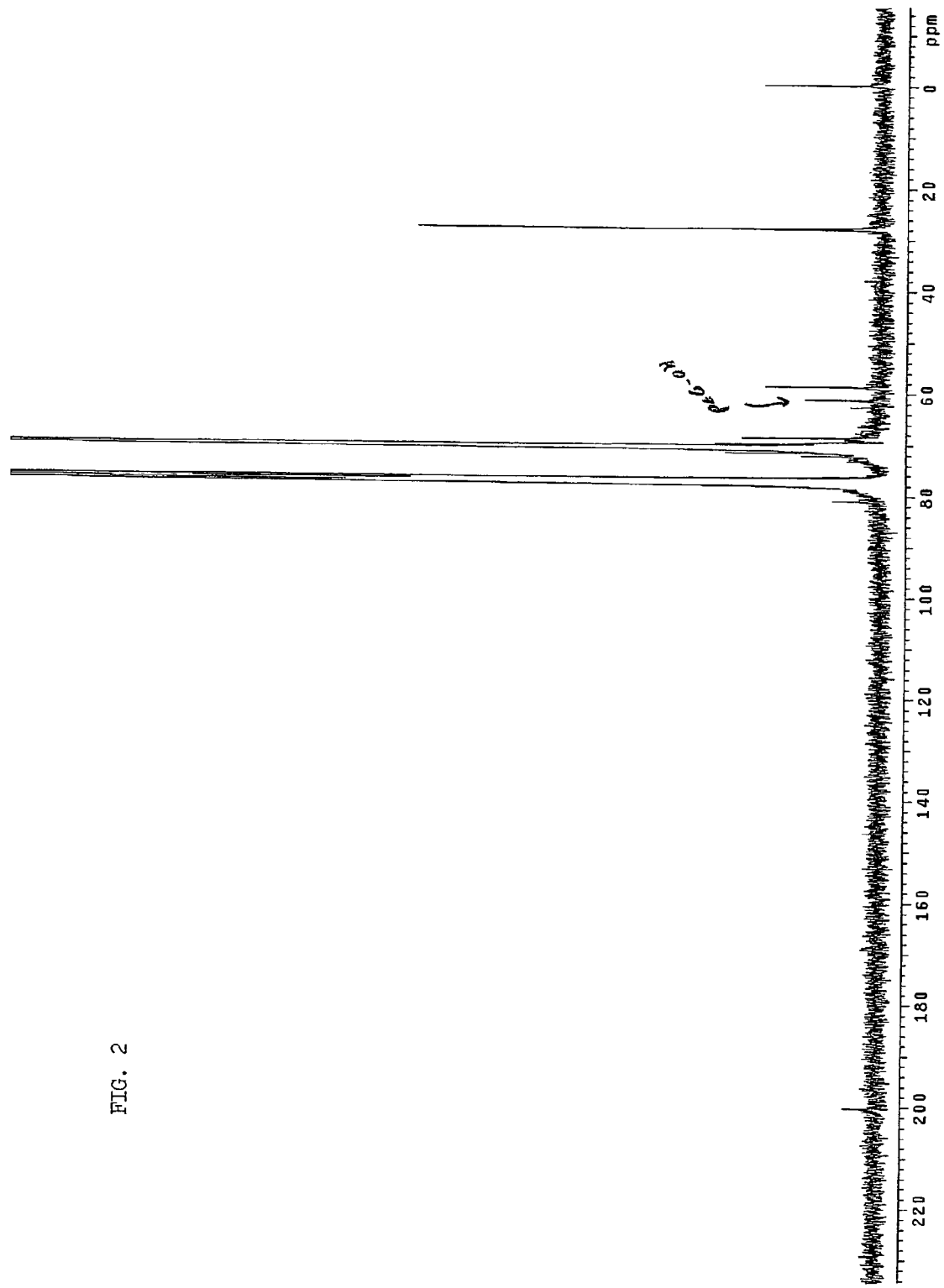
FIG. 2 is an NMR spectra corresponding to comparative Example 4.

The process of Example 1 to make the m-PEG$^{30K}$ ester was followed with a change in one part of the synthesis. After compound 2 was formed, and the 1.6 g (8.3 moles) of t-butyl bromoacetate was added, the resulting cloudy mixture 6 was heated to reflux, followed by removal of the heat, and stirring for 18 hours at room temperature (producing compound 7). This is to be contrasted with the allowing the resulting cloudy mixture to be stirred for 1 hr at 30° C. The product was confirmed by $^{13}$C NMR to be only about 60% pure rather than the >99% pure previously believed because the apparatus used for measuring the peak was significantly more sensitive and found a significant peak at 61.18 ppm for PEG-OH. See FIG. 2. Note the impurity found at 200.26-unknown peak. $^{13}$C NMR (75.4 mHz, CDCl$_3$)δ 200.26, 169.00, 80.95, 74.00-68.00 (PEG), 63.00, impurity unknown, 61.18 (starting material—PEG-OH), 58.60, 27.77.

Example 5 m-PEG$^{30K}$ RNL 8a Aldehyde 9

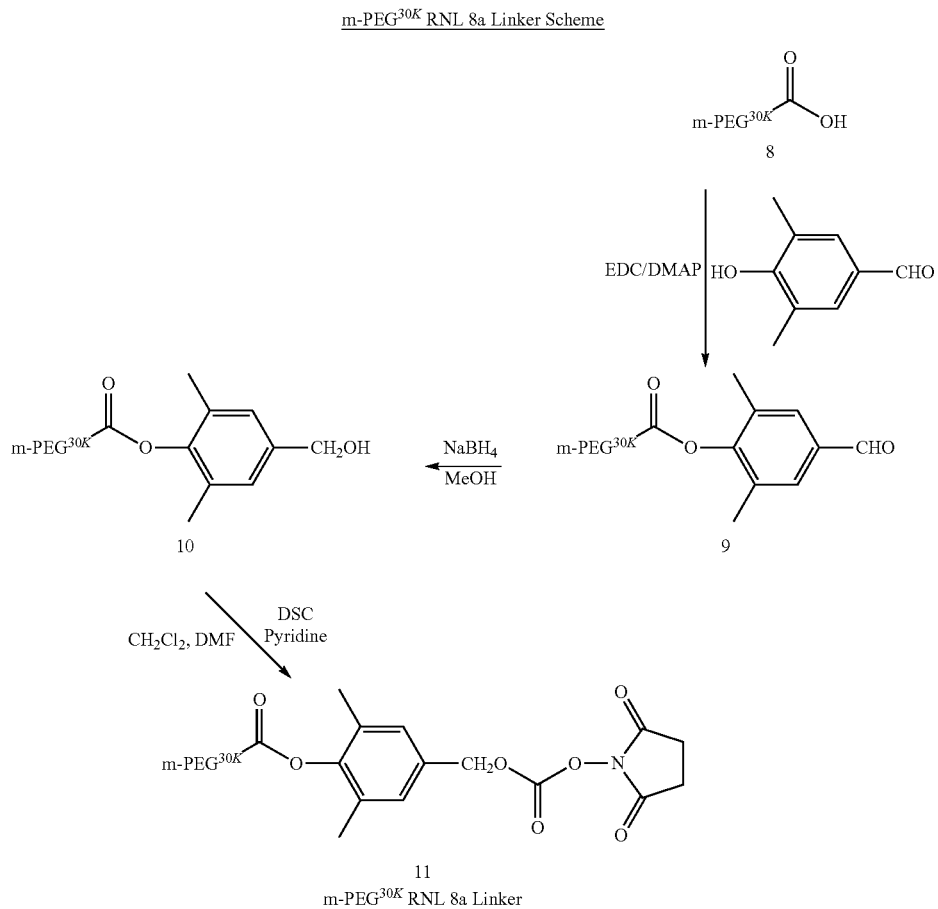

m-PEG$^{30K}$ RNL 8a Linker Scheme

A solution of 10.0 g (0.33 mmoles) of m-PEG$^{30K}$ acid, 8, 0.15 g (1.0 mmoles) of 3,5-dimethyl-4-hydroxybenzaldehyde, and 0.15 g (1.24 mmoles) of DMAP in 90 ml of dry methylene chloride was cooled to 0° C. in an ice bath, followed by addition of 0.19 g (1.0 mmoles) of EDC hydrochloride. This mixture was allowed to warm to room temperature overnight. At this time, the solvent was partially removed by rotovap, the product precipitated with ether, and collected and washed with ether. This crude product was recrystallized from 12% DMF/IPA to yield 9.4 g (94% yield).

$^{13}$C NMR (75.4 MHz, CDCl$_3$) δ 190.80, 167.26, 152.01, 133.74, 131.02, 129.74, 71.57-67.83(PEG), 58.68, 16.19.

Example 6 m-PEG$^{30K}$ RNL 8a Alcohol 10

A solution of 4.8 g (0.16 mmole) of m-PEG$^{30K}$ RNL 8a aldehyde, 9 in 63 ml of anhydrous methanol was cooled to 15° C., followed by addition of 0.01 g (0.25 mmole) of sodium borohydride. This mixture was stirred at 15-20° C. over a period of 2 hrs, followed by adjusting the pH to 6.5 with 1N HCl. The methanol was removed by rotary evaporator, and the residue taken up in water. The pH was lowered to 2.0 with 0.5 N HCl, and the product was extracted from the water with methylene chloride. This extract was dried over anhydrous sodium sulfate and filtered followed by partial removal of the solvent by rotary evaporator. The product was precipitated out with ethyl ether, collected by filtration, and washed with ethyl ether to yield 4.6 g (96% yield) of product.

$^{13}$C NMR (75.4 MHz, CDCl$_3$) δ 167.76, 146.25, 138.68, 129.42, 126.67, 71.55-67.87(PEG), 63.86, 58.65, 16.11.

Example 7 m-PEG$^{30K}$ RNL 8a Linker 11: (Notebook; E1321-36)

A solution of 1.8 g (0.06 mmoles) of m-PEG$^{30K}$ RNL 8a alcohol, 10 in a mixture of 18 ml of methylene chloride and 1.8 ml of DMF was cooled to 0° C., followed by addition of 0.13 g (0.48 mmoles) of DSC and 0.33 g (0.43 mmoles) of pyridine. This mixture was allowed to warm to room temperature overnight. At this time, the solvent was partially removed by rotovap, the product precipitated with ether, and collected and washed with ether. This crude product was recrystallized from 12% DMF/IPA to yield 1.6 (88% yield).

$^{13}$C NMR (75.4 MHz, CDCl$_3$) δ 168.14, 167.59, 151.03, 147.76, 130.53, 130.27, 128.50, 72.97-67.83(PEG), 58.67, 25.17, 16.11.

The final product can be used for conjugation to any number of biologically active polypeptides, enzymes, proteins, small molecules, etc. having an available amine or hydroxyl thereon for conjugation. The procedures for such conjugation reactions have been described, for example, in commonly-assigned U.S. Pat. No. 6,180,095 or the Greenwald et al. J. Med. Chem. 1999 Vol. 42, No. 18, 3657-3667, the contents of each of which are incorporated herein by reference.

We claim:

1. A method of preparing a polyalkylene oxide carboxylic acid, consisting essentially of:
   (a) reacting a polyalkylene oxide with a base, in a first solvent system, for a time period ranging from about 10 minutes to about 60 minutes;
   (b) reacting the product of step (a) in a second solvent system, with a tertiary alkyl haloacetate for a time period up to about 1 hour to form a tertiary alkyl ester of a polyalkylene oxide; and
   (c) reacting the tertiary alkyl ester of a polyalkylene oxide obtained from step (b) with an acid to form a polyalkylene oxide carboxylic acid,
   wherein the reaction of steps (a) and (b) are conducted at a temperature that ranges from about 10° C. to about 35° C.

2. The method of claim 1, wherein the polyalkylene oxide is polyethylene glycol.

3. The method of claim 1, further comprising separating the resulting tertiary alkyl ester of a polyalkylene oxide from the second solvent system.

4. The method of claim 2, wherein the polyethylene glycol is omega methoxypolyethylene glycol.

5. The method of claim 1, wherein the tertiary alkyl haloacetate comprises the formula:

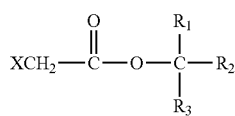

wherein
X is chlorine, bromine or iodine; and
$R_{1-3}$ are independently selected from the group consisting of $C_{1-8}$ alkyls, $C_{1-8}$ substituted alkyls, $C_{1-8}$ branched alkyls and aryls.

6. The method of claim 5, wherein the tertiary alkyl haloacetate is tertiary butyl haloacetate.

7. The method of claim 6, wherein the t-butyl haloacetate is t-butyl bromoacetate or t-butyl chloroacetate.

8. The method of claim 1, wherein the molar ratio of the polyalkylene oxide to the base ranges from 1:1 to about 1:2.

9. The method of claim 1, wherein the base is selected from the group consisting of potassium t-butoxide, butyl lithium, sodium amide, sodium hydride, and combinations thereof.

10. The method of claim 9, wherein the base is potassium t-butoxide.

11. The method of claim 1, wherein the acid is selected from the group consisting of trifluoroacetic acid, sulfuric acid, phosphoric acid, and hydrochloric acid.

12. The method of claim 1, wherein the acid is trifluoroacetic acid.

13. The method of claim 1, wherein the reaction of step (a) is conducted for a time period ranging from about 20 minutes to 40 minutes.

14. The method of claim 1, wherein the solvent system comprises toluene and the reactions of steps (a) and (b) are carried out at a temperature ranging from about 25 to about 31° C.

15. The method of claim 12, wherein step (c) comprises methylene chloride, and the reactions of steps (a) and (b) are carried out at a temperature ranging from about 20 to about 31° C.

16. The method of claim 1 wherein the reaction of step (c) is conducted at a temperature ranging from about 18 to about 30° C.

17. The method of claim 1, wherein the ratio of polyalkylene oxide to solvent system is 1 g polyalkylene oxide to from about 15 to about 25 ml of solvent system.

18. The method of claim 1, wherein the polyalkylene oxide has a molecular weight of from about 200 to about 100,000.

19. The method of claim 18, wherein the polyalkylene oxide has a molecular weight of from about 2,000 to about 80,000.

20. The method of claim 18, wherein the polyalkylene oxide has a molecular weight of from about 4,000 to about 50,000.

21. The method of claim 1, wherein the purity of the produced polyalkylene oxide carboxylic acid is greater than 99% as determined by $^{13}$C NMR.

22. The method of claim 1 wherein the polyalkylene oxide is either a straight chain or a branched chain.

23. The method of claim 1, wherein the polyalkylene oxide has the formula

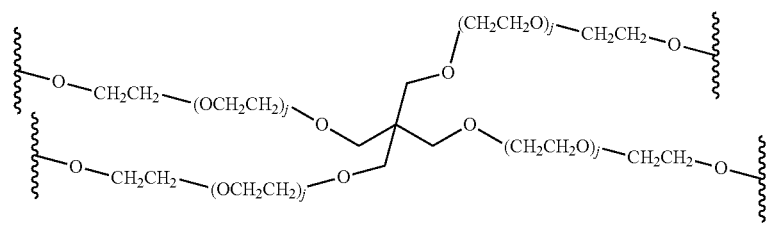

wherein j is an integer from about 10 to about 340.

24. A method of preparing a polyalkylene oxide-biologically active nucleophile conjugate, comprising reacting the polyalkylene oxide carboxylic acid of claim 1 with a biologically active agent containing a nucleophile to form a polyalkylene oxide-biologically active nucleophile conjugate.

25. The method of claim 1, wherein the reaction of step (b) is conducted for a time period ranging from about 1 minute to about 30 minutes.

26. The method of claim 1, wherein the reaction of step (b) is conducted for a time period of from about 1 minute to about 15 minutes.

27. The method of claim 12, wherein the polyalkylene oxide is a straight, star-shaped or multi-armed polyethylene glycol.

* * * * *

UNITED STATES PATENT AND TRADEMARK OFFICE
CERTIFICATE OF CORRECTION

PATENT NO. : 7,989,554 B2  
APPLICATION NO. : 11/328662  
DATED : August 2, 2011  
INVENTOR(S) : Hong Zhao et al.

Page 1 of 1

It is certified that error appears in the above-identified patent and that said Letters Patent is hereby corrected as shown below:

Title Page, Item (54) and at Column 1, lines 1-4,  
The title should read,

"HIGH EFFICIENCY METHOD OF PREPARING POLYALKYLENE OXIDE CARBOXYLIC ACIDS"

Signed and Sealed this  
Eighth Day of November, 2011

David J. Kappos  
*Director of the United States Patent and Trademark Office*